US006722096B2

United States Patent
Von Arx et al.

(10) Patent No.: US 6,722,096 B2
(45) Date of Patent: Apr. 20, 2004

(54) FRAME ASSEMBLY AND FRAME COMPONENT FOR TENSIONING FABRIC ABOUT A PANEL OF A PARTITION SYSTEM

(75) Inventors: John Paul Von Arx, Rice Lake, WI (US); Charles Joseph Librande, Cameron, WI (US)

(73) Assignee: Quanex Corporation, Houston, TX (US)

( * ) Notice: Subject to any disclaimer, the term of this patent is extended or adjusted under 35 U.S.C. 154(b) by 3 days.

(21) Appl. No.: 10/055,683

(22) Filed: Jan. 23, 2002

(65) Prior Publication Data

US 2003/0136073 A1 Jul. 24, 2003

(51) Int. Cl.[7] ............................................... E04F 13/00
(52) U.S. Cl. .................... 52/511; 52/656.1; 160/378; 160/383
(58) Field of Search ................ 160/378, 383; 52/239, 511, 656.1

(56) References Cited

U.S. PATENT DOCUMENTS

| | | |
|---|---|---|
| 1,758,720 A | 5/1930 | Sodergren |
| 2,702,919 A | 3/1955 | Judge |
| 3,058,279 A | 10/1962 | Metcalfe |
| 3,127,695 A | 4/1964 | Discoll et al. |
| 3,379,237 A * | 4/1968 | Worthington ............... 160/371 |
| 3,482,343 A | 12/1969 | Hamu |
| 3,529,653 A | 9/1970 | Fey, Jr. |
| 3,605,851 A | 9/1971 | Miles et al. |
| 3,751,771 A | 8/1973 | Vipond |
| 3,757,479 A | 9/1973 | Martinez |
| 3,768,222 A | 10/1973 | Birum, Jr. |
| 3,822,734 A * | 7/1974 | Tombu ........................ 160/383 |
| 3,871,153 A | 3/1975 | Birum, Jr. |
| 3,914,887 A | 10/1975 | Newman |
| 3,949,827 A | 4/1976 | Witherspoon |
| 3,950,869 A | 4/1976 | Samarin |
| 4,084,367 A | 4/1978 | Saylor et al. |
| 4,112,643 A | 9/1978 | Decker |
| 4,213,493 A | 7/1980 | Haworth |
| 4,215,765 A | 8/1980 | Harris |
| 4,265,039 A | 5/1981 | Brooks |
| 4,296,579 A | 10/1981 | Proud |
| 4,391,073 A | 7/1983 | Mollenkopf et al. |

(List continued on next page.)

Primary Examiner—Jeanette Chapman
(74) Attorney, Agent, or Firm—Howard & Howard

(57) ABSTRACT

A frame for a partition system and a component of the frame are disclosed. The component automatically and evenly tensions a fabric about a partition panel. The component of the frame includes a support element and a lockable element. The support element defines a cavity that receives and supports the panel. The lockable element extends from the support element and supports the fabric that is to be tensioned about the panel. Also, the lockable element is moveable relative to the support element. The component further includes an integral hinge between the support element and the lockable element. The integral hinge enables the movement of the lockable element relative to the support element. As a result, the fabric supported on the lockable element is automatically and evenly tensioned about the panel upon the movement of the lockable element. The component also includes a backing strip to protect the fabric from the integral hinge.

53 Claims, 5 Drawing Sheets

U.S. PATENT DOCUMENTS

| | | | |
|---|---|---|---|
| 4,430,814 A | 2/1984 | Wulc | |
| 4,433,021 A | 2/1984 | Riel | |
| 4,446,663 A | 5/1984 | Stampf et al. | |
| 4,451,997 A | 6/1984 | Jones | |
| 4,452,138 A | 6/1984 | Bubley et al. | |
| 4,549,334 A | 10/1985 | Miller | |
| 4,553,365 A | 11/1985 | Bechstein | |
| 4,567,698 A | 2/1986 | Morrison | |
| 4,571,906 A | 2/1986 | Ashton | |
| 4,593,508 A | 6/1986 | Curatolo | |
| 4,625,490 A | 12/1986 | Baslow | |
| 4,630,416 A | 12/1986 | Lapins et al. | |
| 4,635,410 A | 1/1987 | Chumbley | |
| 4,635,418 A | 1/1987 | Hobgood | |
| 4,676,016 A * | 6/1987 | Phillips et al. | 40/617 |
| 4,689,929 A | 9/1987 | Wright | |
| 4,699,836 A | 10/1987 | Fearon et al. | |
| 4,722,146 A | 2/1988 | Kemeny | |
| 4,805,330 A * | 2/1989 | Bubernak | 40/617 |
| 4,817,699 A | 4/1989 | Fein | |
| 4,887,626 A | 12/1989 | Dalo et al. | |
| 4,891,920 A | 1/1990 | Pingston | |
| 4,891,922 A | 1/1990 | Hozer et al. | |
| 4,896,469 A | 1/1990 | Wright | |
| 4,949,518 A | 8/1990 | Nagel et al. | |
| 4,989,688 A | 2/1991 | Nelson | |
| 5,040,586 A * | 8/1991 | Hillstrom | 160/383 |
| 5,054,255 A | 10/1991 | Maninfior | |
| 5,056,577 A | 10/1991 | DeLong et al. | |
| 5,086,606 A | 2/1992 | Finses | |
| 5,134,826 A | 8/1992 | La Roche et al. | |
| 5,136,797 A | 8/1992 | Hildebrandt | |
| 5,142,997 A | 9/1992 | DeLong et al. | |
| 5,172,530 A | 12/1992 | Fishel et al. | |
| 5,174,353 A | 12/1992 | Schmeichel et al. | |
| 5,175,969 A | 1/1993 | Knauf et al. | |
| 5,207,262 A * | 5/1993 | Rushford | 160/354 |
| 5,230,377 A | 7/1993 | Berman | |
| 5,258,083 A | 11/1993 | Monk et al. | |
| 5,271,171 A | 12/1993 | Smith | |
| 5,274,970 A | 1/1994 | Roberts | |
| 5,275,224 A | 1/1994 | Morris | |
| 5,407,522 A | 4/1995 | Insalaco et al. | |
| 5,424,497 A | 6/1995 | Dias et al. | |
| 5,467,546 A | 11/1995 | Kovalak, Jr. | |
| 5,493,800 A | 2/1996 | Chinitz | |
| 5,606,836 A | 3/1997 | Insalaco et al. | |
| 5,606,919 A | 3/1997 | Fox et al. | |
| 5,642,593 A | 7/1997 | Shieh | |
| 5,723,831 A | 3/1998 | Martin et al. | |
| 5,737,893 A | 4/1998 | Rossiter et al. | |
| 5,743,055 A | 4/1998 | Conner et al. | |
| 5,809,715 A | 9/1998 | Tanaka | |
| 5,839,240 A | 11/1998 | Elsholz et al. | |
| 5,875,596 A | 3/1999 | Muller | |
| 5,899,035 A | 5/1999 | Waalkes et al. | |
| 5,930,963 A | 8/1999 | Nichols | |
| 6,000,179 A | 12/1999 | Musculus et al. | |
| 6,009,676 A | 1/2000 | Feldpausch et al. | |
| 6,052,958 A | 4/2000 | Miedema et al. | |
| 6,108,997 A * | 8/2000 | Blais et al. | 52/656.7 |
| 6,132,666 A | 10/2000 | Foley et al. | |
| 6,164,364 A | 12/2000 | Morris | |
| 6,167,665 B1 | 1/2001 | Dame et al. | |
| 6,170,901 B1 | 1/2001 | Hartmann et al. | |
| 6,314,687 B1 | 11/2001 | Schondelmayer et al. | |
| 6,397,533 B1 | 6/2002 | Hornberger et al. | |
| 6,415,567 B1 | 7/2002 | Mead et al. | |
| 6,431,251 B1 | 8/2002 | Yerusalim et al. | |
| 6,442,909 B2 | 9/2002 | Waalkes et al. | |
| 6,446,396 B1 | 9/2002 | Marangoni et al. | |
| 6,493,968 B2 | 12/2002 | Chinitz | |
| 6,499,262 B1 | 12/2002 | Pinchot et al. | |

* cited by examiner

FRAME ASSEMBLY AND FRAME COMPONENT FOR TENSIONING FABRIC ABOUT A PANEL OF A PARTITION SYSTEM

RELATED APPLICATIONS

The subject application is related to commonly-assigned United States patent application entitled "Method Of Assembling A Frame Assembly For A Partition System" which was filed on the same day as the subject application.

BACKGROUND OF THE INVENTION

1. Technical Field

The subject invention generally relates to a frame assembly for a partition, or cubicle, system for dividing office space, building space, and the like. More specifically, the subject invention relates to a frame component of the frame assembly that automatically and evenly tensions a fabric about a partition panel of the frame assembly.

2. Description of the Related Art

Partition systems are known in the art. Partition systems are primarily made up of a plurality of partition panels that are interconnected upon installation of the partition system. Partition systems may also include frame assemblies that include frame components to border, or frame, the partition panels. The partition panels of the partition systems are utilized to divide office space between co-workers and others to enhance privacy and to improve work efficiency. Partition systems are becoming increasingly popular for various reasons. For instance, installation of a partition system requires a relatively low capital investment as compared to the capital investment required to construct permanent walls for division of office space. Furthermore, partition systems are dynamic. That is, partition systems can be quickly and inexpensively reconfigured to reallocate office space. A example of a conventional partition system is disclosed in U.S. Pat. No. 5,839,240 to Elsholz et al.

To enhance the overall appearance of the partition systems, a 'show surface' of the partition panels is covered by a fabric. For the fabric to appear acceptable on the partition panels, it must be appropriately tensioned about the partition panels. In the partition systems of the prior art, the show surface of the partition panel is covered and the fabric is tensioned about the partition panels by a process of manually stretching, i.e., tensioning, the fabric about the partition panel. As understood by those skilled in the art, this manual stretching process is labor-intensive, time-consuming, expensive, and otherwise cumbersome. Furthermore, because this manual stretching process is inconsistent, the process frequently does not achieve appropriate tension on the fabric. Ultimately, unacceptable ripples and sags are visible in the fabric covering the partition panel. The partition systems of the prior art do not utilize the frame components that frame the partition panels to eliminate this manual stretching process.

It is noteworthy that, in other industries, systems other than partition systems have previously attempted to utilize a frame component to address some of the aforementioned deficiencies. For example, in U.S. Pat. No. 3,950,869 to Samarin, a frame component for stretching an artist's fabric, such as canvas and the like, is disclosed. The frame component disclosed in the '869 patent to Samarin is particularly deficient in that it is not unitary. Furthermore, this frame component does not define a cavity to effectively receive and support partition panels for a partition system. In U.S. Pat. No. 5,230,377 to Berman, a border piece, i.e., a frame component, for mounting an upholstered wall fabric is disclosed. Like the '869 patent to Samarin, the frame component disclosed in the '377 patent to Berman is deficient because it does not define a cavity to effectively receive and support partition panels for a partition system. Finally, in U.S. Pat. No. 3,751,771 to Vipond, a frame component for securing a fabric to upholstered furniture is disclosed. The frame component disclosed in the '771 patent to Vipond is also deficient because it does not define a cavity for partition panels of a partition system.

Due to the deficiencies identified in the partition systems of the prior art and also due to the deficiencies identified in frame components that are utilized for alternative purposes, there is a need to provide a frame assembly for a partition system and a frame component of the frame assembly that effectively receives and supports partition panels for the partition system, and that automatically and evenly tensions a fabric about a partition panel.

SUMMARY OF THE INVENTION AND ADVANTAGES

A frame assembly for a partition system and a frame component of the frame assembly are disclosed. The frame component automatically and evenly tensions a fabric about a partition panel. The terminology of tensioning and stretching are used interchangeably throughout. The frame component includes a support element and a lockable element. The support element defines at least one cavity. The cavity defined by the support element receives and supports at least a portion of the partition panel. The lockable element extends from the support element and is moveable relative to the support element. The lockable element also supports at least a portion of the fabric.

The frame component further includes an integral hinge portion defined between the support element and the lockable element. The integral hinge portion enables the movement of the lockable element relative to the support element. As such, the fabric, which is supported on the lockable element, is automatically and evenly tensioned about the partition panel upon the movement of the lockable element relative to the support element. Optionally, the frame component may further include a flexible backing strip that spans the support element and the lockable element. If included, the flexible backing strip protects the fabric from the integral hinge portion as the lockable element moves to tension the fabric about the partition panel.

Accordingly, the subject invention provides a frame assembly for a partition system and a frame component of the frame assembly that is able to effectively receive and support partition panels for the partition system. The frame component of the subject invention also provides automatic and even tension for a fabric about the partition panels. The automatic and even tension for the fabric improves the overall appearance of the partition system and avoids unacceptable ripples and sags in the fabric.

BRIEF DESCRIPTION OF THE DRAWINGS

Other advantages of the present invention will be readily appreciated as the same becomes better understood by reference to the following detailed description when considered in connection with the accompanying Figures wherein.

DETAILED DESCRIPTION OF A PREFERRED EMBODIMENT

Figure 1:
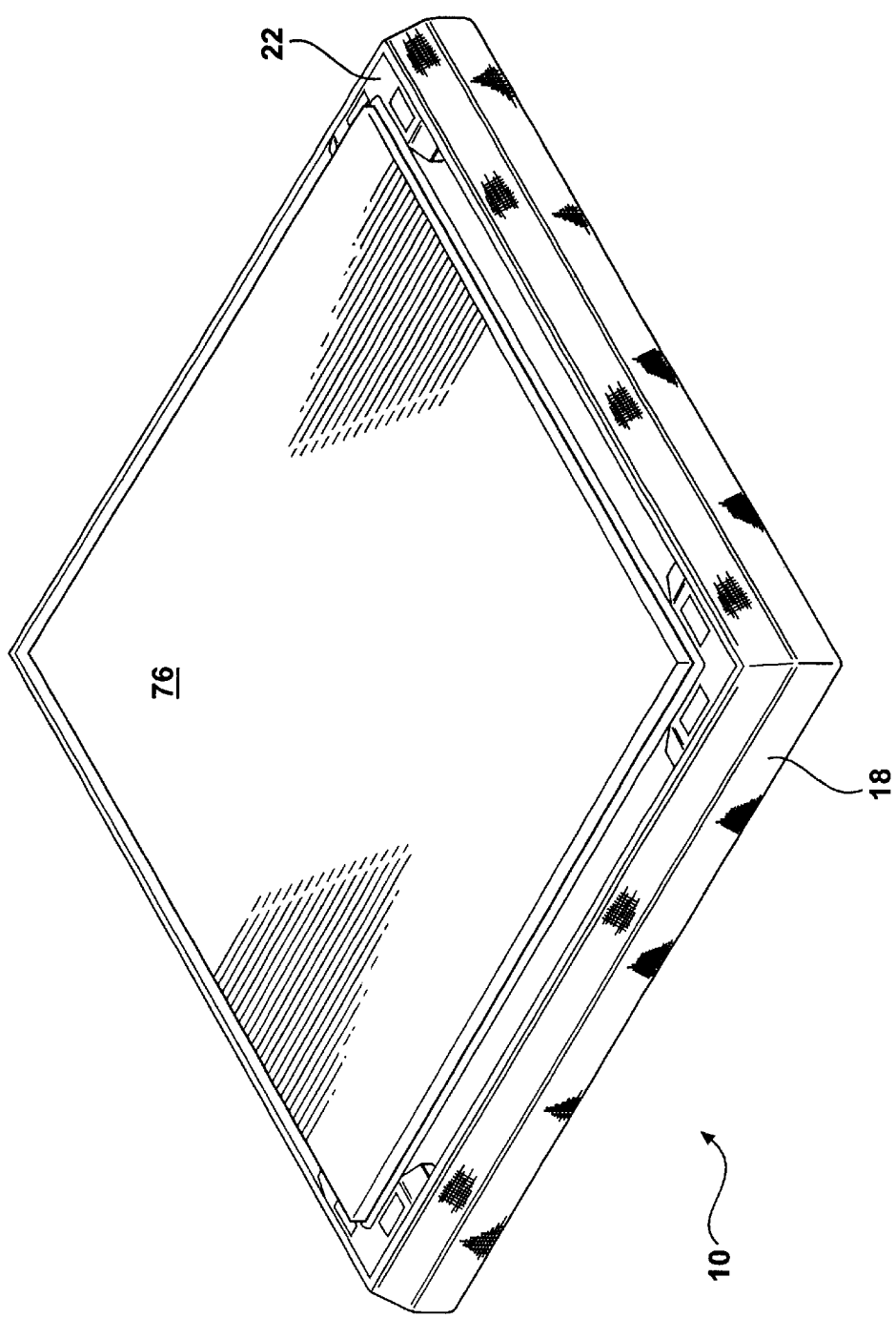
FIG. 1 is a perspective view of a frame assembly illustrating fabric adhered to frame components that are interconnected by corner locks to support a first partition panel.

Referring now to the Figures, wherein like numerals indicate like or corresponding parts throughout the several views, a frame assembly for a partition, or cubicle, system is generally shown at 10. The frame assembly 10 includes at least one partition panel 12. In the preferred embodiment, the frame assembly 10 includes a first partition panel 14 and a second partition panel 16. Accordingly, although the frame assembly 10 may include only one partition panel 12, the subject invention is described below in terms of the first and second partition panels 14, 16.

The partition panels 14, 16 can be manufactured from a wide variety of materials. For example, the partition panels 14, 16 can be manufactured from composite or particulate materials such as fiberglass, from metal, from wood, from foam, and even from laminate materials such as Formica. Preferably, the first partition panel 14 is a corrugated partition panel manufactured from a low-density fiberglass material. The first partition panel 14 provides cushioning and also acoustical properties, such as sound deadening, to the partition system. Preferably, the second partition panel 16 is manufactured from a high-density fiberglass material. The second partition panel 16 provides 'tackability' to the partition system such that items can be pinned or tacked to the second partition panel 16. Furthermore, although the first and second partition panels 14, 16 are preferably rectangular in shape it is to be understood that the partition panels 14, 16 may be otherwise shaped depending on individual preferences and design considerations.

The frame assembly 10 also includes a fabric 18 that covers the at least one partition panel to enhance the overall appearance of the partition system. Although it is not preferred, the frame assembly 10 may include more than one fabric 18 to cover the at least one partition panel 12. Preferably, there is only one fabric 18 and it is cloth. However, other fabrics including, but not limited to, canvas, burlap, and silk, are also suitable. In the preferred embodiment including the first and second partition panels 14, 16, the fabric 18 covers, the second partition panel 16. To maximize the overall appearance of the partition system, the fabric 18, in the subject invention, is automatically and evenly tensioned about the second partition panel 16 thereby eliminating any ripples or sags in the fabric 18. The automatic and even tensioning of the fabric 18 about the second partition panel 16 is described in greater detail below.

The frame assembly 10 includes at least one frame component 20 to appropriately tension the fabric 18 about the second partition panel 16. The frame component 20 automatically and evenly tensions the fabric 18. For descriptive purposes only, the subject invention is described in terms of one frame component 20. However, the frame assembly 10 preferably includes a plurality of frame components 20. The frame assembly 10 also includes a plurality of corner locks 22. The corner locks 22 engage the frame components 20 to interconnect the frame components 20 and establish a rectangular-shaped frame assembly 10 where the frame components 20 are interconnected to form a continuous rectangle. As shown in the Figures, each of the corner locks 22 preferably includes first and second arms, not numbered, that extend through a 90° bend. As a result, the corner locks 22 are able to square the frame assembly 10.

Figure 2:
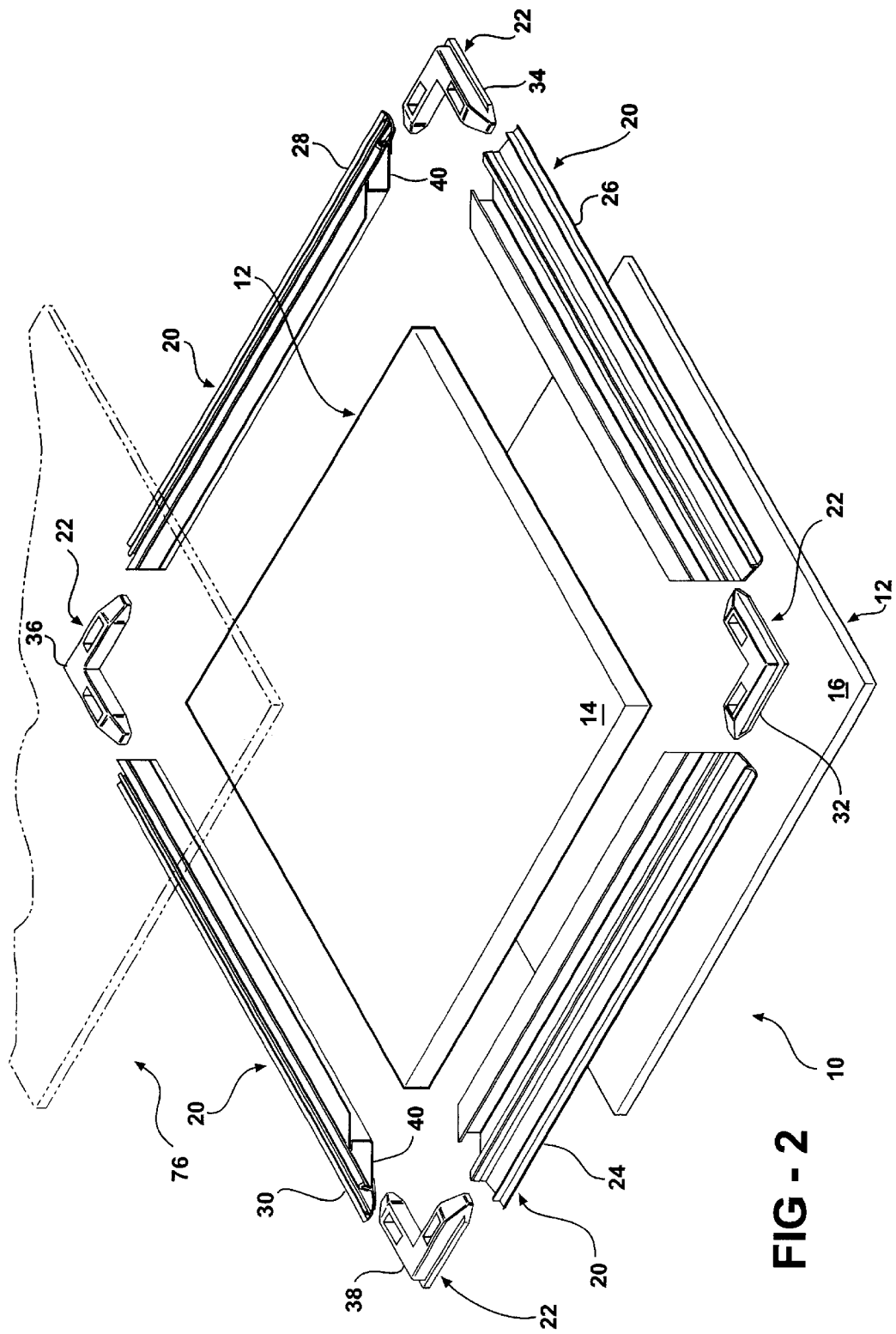
FIG. 2 is an exploded perspective view of the frame assembly disclosed in FIG. 1 illustrating the first partition panel, a second partition panel, and a backing plate.

It is to be understood that the number of frame components 20 and the number of corner locks 22 used in the frame assembly 10 may vary depending on the desired size and shape of the frame assembly 10 and depending also on certain production considerations, such as where the frame component 20 is cut. For example, only one continuous frame component 20, which is rectangular- or box-shaped, may be used in forming the frame assembly 10. As a further example, if the rectangular-shaped frame assembly 10 is desired, and the frame component 20 is L-shaped, then two frame components 20 and two corner locks 22 are used in the rectangular-shaped frame assembly 10. Alternatively, if the rectangular-shaped frame assembly 10 is desired, and the frame component 20 is straight, then four frame components 20 and four corner locks 22, as shown in FIGS. 1 and 2, are used in the rectangular-shaped frame assembly 10. For descriptive purposes, the four frame components 20 are referred to as first 24, second 26, third 28, and fourth 30 frame components, and the four corner locks 22 are referred to as first 32, second 34, third 36, and fourth 38 corner locks.

The frame component 20 of the subject invention is formed in a metal forming process. More specifically, a coiled aluminum or steel sheet, having a preferred thickness of 0.028 inches, is roll-formed in a multiple pass process. The coiled sheet is preferably aluminum, specifically an aluminum alloy, including a particular, predetermined temper. Suitable aluminum alloys include, but are not limited to, Aluminum Association Alloy Nos. 3105, 3003, and 5052, which are known in the art. The coiled sheet is preferably pre-treated to eliminate any potential contaminants, such as greases, processing oils, and the like, and to enhance certain physical properties as needed. If the coiled sheet is the aluminum alloy, then it is preferably pre-treated with a zinc-based pre-treat composition. On the other hand, if the coiled sheet is steel, then it is preferably pre-treated with a phosphate-based pre-treat composition. It is to be understood that the particular material used as the coiled sheet to form the frame component 20 may exceed the scope of the aluminum alloys listed above without varying the scope of the invention as claimed. Additionally, the temper of the material that is selected to from the frame component 20 may vary depending on the particular tensile and yield strengths desired.

Figure 3:
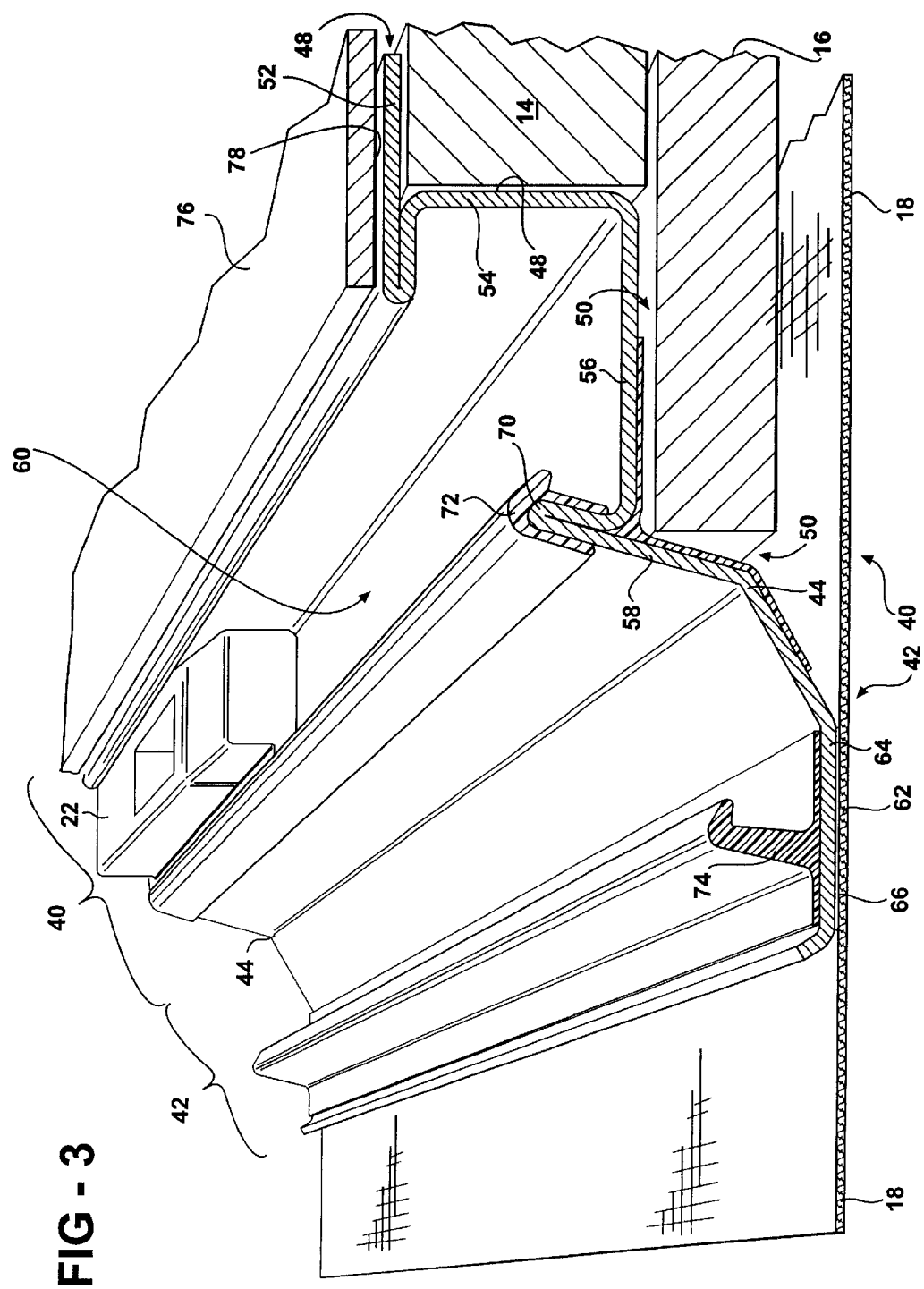
FIG. 3 is a partially cross-sectional perspective view of a frame component including a support element and a lockable element where the frame component is in a relaxed configuration and the first and second partition panels are supported in slots of the frame component.
Figure 4:
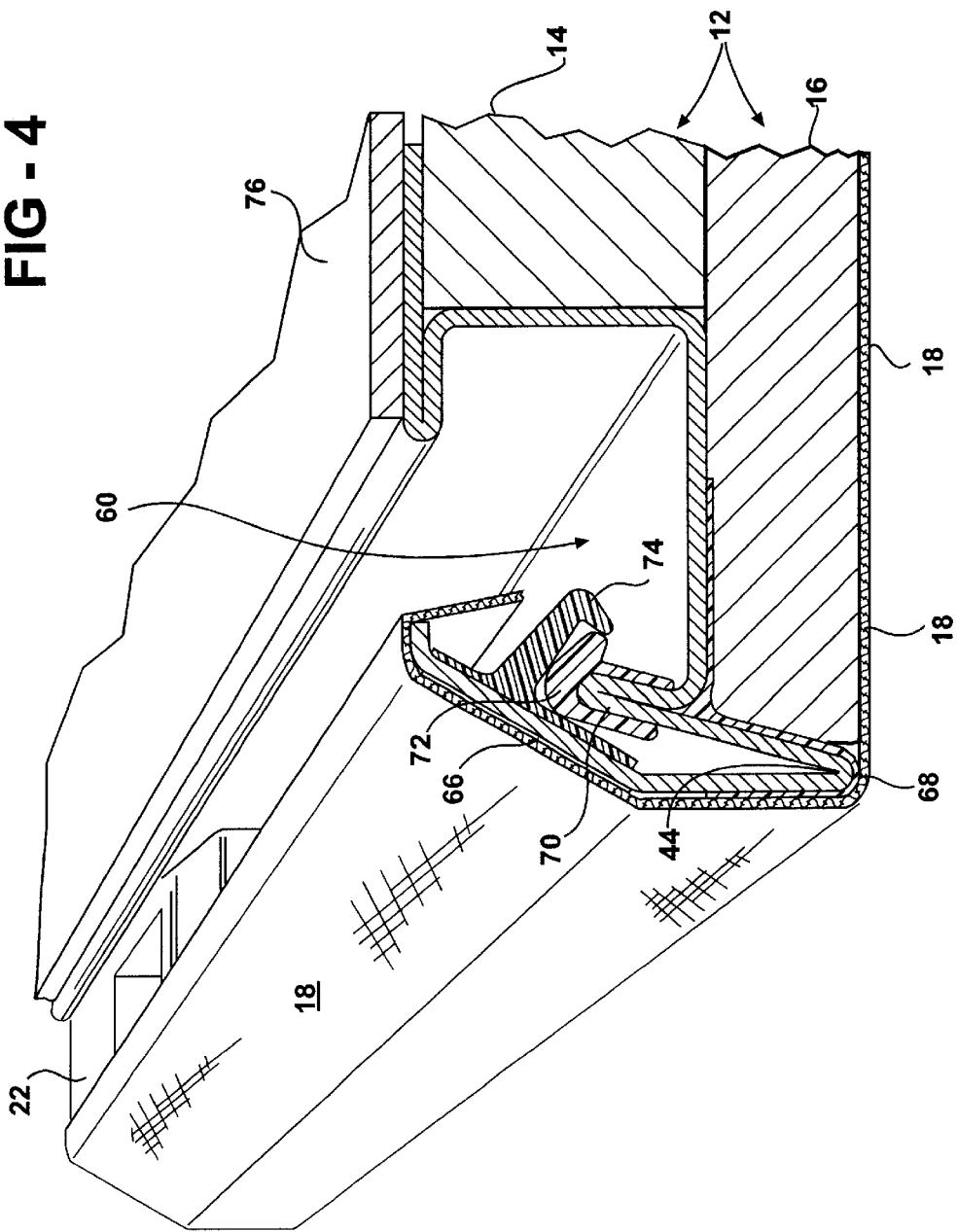
FIG. 4 is a partially cross-sectional perspective view of the frame component disclosed in FIG. 3 in a tensioned configuration where the lockable element has been moved relative to the support element to tension the fabric about the second partition panel.

Referring primarily to FIGS. 3 and 4, the frame component 20 includes a support element 40, a lockable element 42, and an integral hinge portion 44. The frame component 20 is preferably unitary, i.e., one piece, between the support element 40, the lockable element 42, and the integral hinge portion 44. Although possible, it is not preferred that the support element 40, the lockable element 42, and the integral hinge portion 44 are discrete units that are somehow welded or otherwise fastened together. The support element 40 is defined on one side of the integral hinge portion 44, and the lockable element 42 is defined on the opposite side of the integral hinge portion 44.

The support element 40 defines at least one cavity, disclosed in FIG. 3, but not numbered. The cavity 46 is appropriately structured to receive and support at least a portion, not numbered, of the partition panel 12. The support element 40 more specifically defines a first cavity 48 and a second cavity 50. The first cavity 48 receives and supports at least a portion of the first partition panel 14, and the second cavity 50 receives and supports at least a portion of the second partition panel 16. As disclosed in FIG. 3, the first cavity 48 is 'filled in' with the first partition panel 14 such that there is no space between the first partition panel 14 and the support element 40, and the second cavity 50 is 'filled in' with the second partition panel 16 such that there is no space between the second partition panel 16 and the support element 40.

The support element 40 of the frame component 20 includes a first segment 52 or wall, a second segment 54, a third segment 56, and a fourth segment 58. The second segment 54 extends transversely from the first segment 52 to define the first cavity 48. The first partition panel 14 is conveniently housed in the first cavity 48, formed from the first and second segments 52, 54, for support. The third segment 56 extends transversely from the second segment 54, and the fourth segment 58 extends transversely from the third segment 56 to define the second cavity 50. The second partition panel 16 is conveniently housed in the second cavity 50, formed from the third and fourth segments 56, 58, for support. Also, a rear channel 60 of the support element 40 is defined between the second and third segments 54, 56. This rear channel 60 receives the corner locks 22.

As shown in the Figures, the corner locks 22 that were described above actually engage the frame component 20 at the support element 40. That is, the corner locks 22 engage the support element 40 to interconnect the frame components 20 and establish the rectangular-shaped frame assembly 10. Therefore, in the example set forth above where four straight frame components 20 and four corner locks 22 are used to establish the frame assembly 10, the first corner lock 32 engages the support element 40 of the first and second frame components 24, 26, the second corner lock 34 engages the support element 40 of the second and third frame components 26, 28, the third corner lock 36 engages the support element 40 of the third and fourth frame components 28, 30, and the fourth corner lock 38 engages the support element 40 of the fourth and first frame components 30, 24.

The frame component 20 also includes the lockable element 42. The lockable element 42 extends from the support element 40, specifically from the fourth segment 58 of the support element 40. Also, the lockable element 42 is moveable relative to the support element 40 (refer to the differences between FIGS. 3 and 4). The lockable element 42 can be moved relative to the support element 40 manually, e.g. by hand, or automatically, e.g. by machine. In FIG. 3, the frame component 20 is disclosed in a relaxed configuration where the lockable element 42 has not been moved relative to the support element 40 and, consequently, the fabric 18 is not tensioned about the second partition panel 16. In FIG. 4, the frame component 20 is disclosed in a tensioned configuration where the lockable element 42 has been moved, i.e., folded or bent upwardly, relative to the support element 40 and, consequently, the fabric 18 is tensioned equally about the second partition panel 16. The movement of the lockable element 42 relative to the support element 40 is described in greater detail below.

The lockable element 42 supports at least a portion 62 of the fabric 18. More specifically, the lockable element 42 includes a flat segment 64 to support the portion 62 of the fabric 18. The flat segment 64 maximizes a surface area of the lockable element 42 that is available for suitably supporting the portion 62 of the fabric 18. An adhesive 66 is disposed on the lockable element 42. The adhesive 66 retains the portion 62 of the fabric 18 on the lockable element 42. More specifically, the adhesive 66 is a polyurethane resin that is pre-applied to the flat segment 64 of the lockable element 42 to adhere the fabric 18 to the flat segment 64. The adhesive, preferably the polyurethane resin, may be applied to the flat segment 64 by any suitable application technique including, but not limited to, wiping, rolling, dipping, and spraying.

Figure 6:
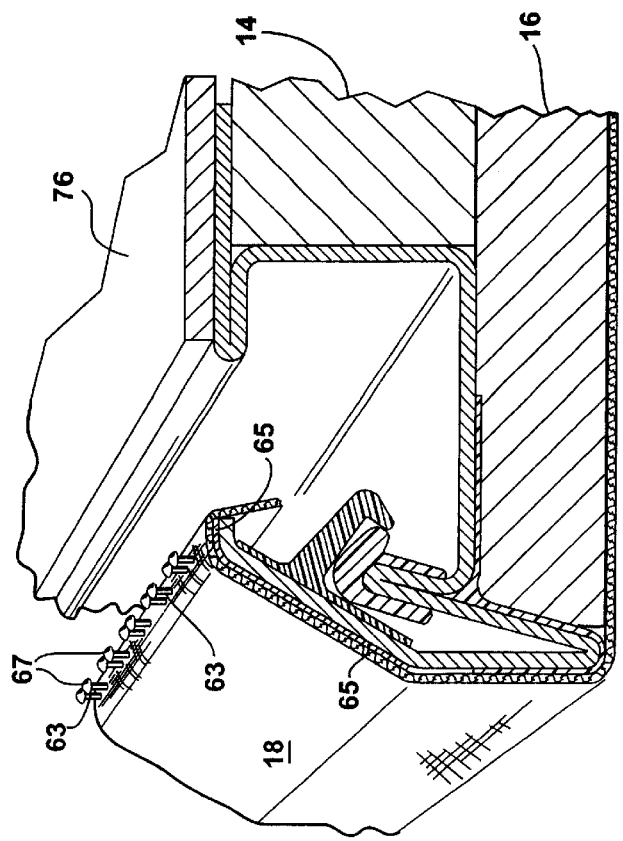
FIG. 6 is a partially cross-sectional perspective view of the frame component illustrating mushroom-type fastening devices that are used to retain the fabric to the lockable element.
Figure 5:
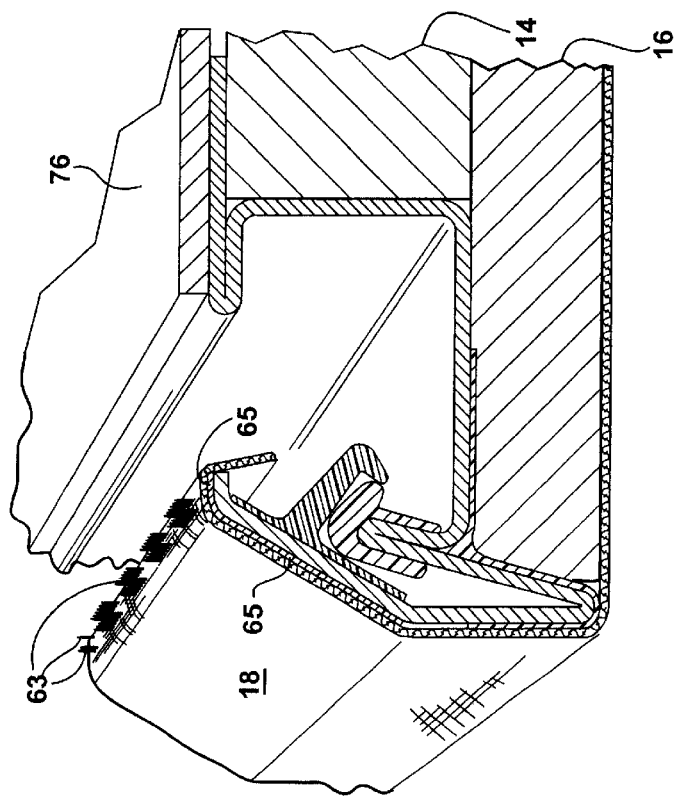
FIG. 5 is a partially cross-sectional perspective view of the frame component illustrating fastening stems that are used to retain the fabric to the lockable element.

Alternatively, as shown in FIGS. 5 and 6, the portion 62 of the fabric 18 may be retained on the lockable element 42 by a plurality of fastening stems 63, instead of the adhesive 66. These fastening stems 63 extend from the lockable element 42 to retain the portion 62 of the fabric. More specifically, in preferred embodiments of the subject invention, the fastening stems 63 extend from a fastener support strip 65. The fastener support strip 65, having the fastening stems 63, may be conventionally mounted, e.g. snap-fit, or extruded onto the frame component 20. The fastening stems 63 extend from the lockable element 42, via the fastener support strip 65, through the fabric 18 to retain the portion 62 of the fabric 18 on the lockable element 42. More specifically, the portion 62 of the fabric 18 is wrapped about the fastening stems 63 such that the stems 63 extend through the fabric 18 to retain the fabric 18 to the lockable element 42 of the frame component 20. It is preferred that the pattern, grain, texture, and/or fibers of the fabric 18 run 180° relative to the fastening stems 63 to encourage optimal retention of the fabric 18 on the lockable element 42. Use of the fastening stems 63 enables the fabric 18 to be replaced, if desired.

Referring specifically to FIG. 6, dome-shaped head portions 67 may be disposed on the fastening stems 63 to retain the portion 62 of the fabric 18 on the lockable element 42. Although not required, it is preferred that there is one dome-shaped head portion 67 disposed on each of the fastening stems 63. The dome-shaped head portions 67 extend through the fabric 18 to encourage optimal retention of the fabric 18 on the lockable element 42. As understood by those skilled in the art, the dome-shaped head portions 67 and the fastening stems 63 are frequently referred to as mushroom-type fastening device.

It is to be understood that the number, size, and orientation of the fastening stems 63, if utilized, and of the dome-shaped head portions 63, if utilized, can vary depending on the type of fabric 18, and other variables. For instance, the fastening stems 63 are shown in two rows in FIG. 5, and it may be determined that more or less rows are required to suitably support and retain the fabric 18 on the lockable element 42.

As set forth above, the frame component 20 also includes the integral hinge portion 44. The integral hinge portion 44 functions as a 'living hinge' defined between the support element 40 and the lockable element 42. In the preferred embodiment, the integral hinge portion 44 is the only bend point for the frame component 20. The integral hinge portion 44 enables the movement of the lockable element 42 relative to the support element 40. As such, when the lockable element 42 of the frame component 20 moves relative to the support element 40, the fabric 18, which is supported on the lockable element 42, is automatically and evenly tensioned about the second partition panel 16. As shown in the Figures, the lockable element 42 of the frame component 20 is folded or bent upwardly about the integral hinge portion 44 to automatically and evenly tension the fabric 18 about the second partition panel 16. In a sense, the frame component 20 is essentially folded upon itself. In the preferred embodiment, the fabric 18 is automatically and evenly tensioned about the second partition panel 16 that is supported in the second cavity 50.

In the embodiment having the first, second, third, and fourth frame components 24, 26, 28, 30, respectively, interconnected by the four corner locks 22, the lockable element 42 of each of these frame components 24, 26, 28, 30 are all moved relative to the support element 40, at one time, i.e., at the same time. Consequently, the fabric 18 is tensioned evenly, or equally in all directions, between the four frame components 24, 26, 28, 30.

Depending on the material of construction of the frame component 20, the frame component 20, and the pre-treat composition on the frame component 20, may split, crack, or splinter at the integral hinge portion 44 when the lockable element 42 is moved relative to the support element 40, i.e., when the frame component 20 is in the tensioned modified configuration of FIG. 4. Accordingly, the frame component 20 further includes a flexible backing strip 68 to protect the fabric 18 such that the fabric 18 does not rip or tear when the lockable element 42 is moved. More specifically, the flexible backing strip 68 spans both the support element 40 and the lockable element 42 to protect the fabric 18 from the integral hinge portion 44 as the lockable element 42 moves to tension the fabric 18 about the second partition panel 16.

The frame component 20 further includes an engagement lip 70. The engagement lip 70 of the frame component 20 extends integrally from the support element 40 and away from the lockable element 42. Upon movement of the lockable element 42, the engagement lip 70 engages the lockable element 42 to retain, i.e., lock, the lockable element 42 in the tensioned position where the fabric 18 is permanently tensioned about the second partition panel 16. Alternatively, it is to be understood that the engagement lip 70 of the subject invention may extend integrally from the lockable element 42 rather than from the support element 40.

To further improve engagement between the lockable element 42 and the support element 40, the frame component 20 further includes a first locking mechanism 72. The first locking mechanism 72 is disposed on the engagement lip 70 and directly engages the lockable element 42 upon the movement of the lockable element 42 from the relaxed configuration to the tensioned configuration. The frame component 20 may also further include a second locking mechanism 74. The second locking mechanism 74 projects from the lockable element 42 to engage the first locking mechanism 72 disposed on the support element 40. Upon movement of the lockable element 42, the first and second locking mechanisms 72, 74 interlock such that the unitary frame component 20 is self-locking.

The flexible backing strip 68, the first locking mechanism 72, and the second locking mechanism 74 are preferably formed from polyvinyl chloride (PVC) and, for descriptive purposes only, are referred to below as "the PVC components." Furthermore, although the PVC components may be conventionally mounted, e.g. snap fit, onto the frame component 20, the PVC components are preferably extruded onto the frame component 20.

Because the flexible backing strip 68 requires some degree of flexibility to withstand the movement of the lockable element 42 relative to the support element 40 about the integral hinge portion 44 of the frame component 20, it is extruded from a flexible PVC composition. Alternatively, the first and second locking mechanisms 72, 74 primarily require durability and rigidity. These locking mechanisms 72, 74 require only a minor degree of flexibility such that one of the locking mechanisms 72, 74 can snap, or lock, over the other of the locking mechanisms 72, 74. Accordingly, the first and second locking mechanisms 72, 74 are extruded from a rigid PVC composition that is different from the flexible PVC composition. Also, it is to be understood that certain adhesion promoting coating compositions including, but not limited to acrylic-, polyester-, and polyurethane-based coating compositions may be applied between the frame component 20 and the PVC components prior extrusion to enhance adhesion between the frame component 20 and the PVC components. These adhesion promoting coating compositions form a 'tie layer' between the frame component 20 and the PVC components.

In the preferred embodiment, after the frame component 20 has been roll-formed, the frame component 20 is fed into a first extruder where the rigid PVC composition is introduced. In the first extruder, the first locking mechanism 72 is extruded onto the engagement lip 70 of the support element 40, and the second locking mechanism 74 is extruded onto the lockable element 42. Subsequently, the frame component 20, having the first and second locking mechanisms 72, 74, is fed into a second extruder where the flexible PVC composition is introduced. In the second extruder, the flexible backing strip 68 is extruded onto the frame component 20 to span the support element 40 and the lockable element 42. Other steps typically associated with extrusion processes including, but not limited to, trimming, sizing, cooling, and cutting, may be relied upon to form the flexible backing strip 68 and the first and second locking mechanisms 72, 74.

To reinforce the partition panel 12, in particular the first partition panel 14, and also to provide overall rigidity to the frame assembly 10, the frame assembly 10 further includes a backing plate 76. The backing plate 76 is mounted to the support element 40 of each frame component 20 to reinforce and provide rigidity. More specifically, the backing plate 76 is mounted to a backing surface 78 of the first segment 52 of each support element 40. An adhesive, not shown in the Figures, preferably a polyurethane-based adhesive, is applied to the backing surface 78 of the first segment 52 for adhering the backing plate 76 to the support element 40 of each frame component 20.

The backing plate 76 spans across the partition panel 12 to reinforce the partition panel 12. To appropriately reinforce the partition panel 12, the backing plate 76 only has to span across a portion of the partition panel 12. Preferably though, the backing plate 76 spans across the entire partition panel 12. Because the backing plate 76 spans across the partition panel 12 and because the backing plate 76 is mounted or otherwise connected to the support element 40 of each frame component 20 or components 20, the backing plate 76 also serves to improve the overall rigidity in the frame assembly 10.

A method of assembling the frame assembly 10 includes the step of providing the frame component 20, inserting the partition panel 12 into the cavity 46, and mounting the fabric 18 to the lockable element 42 of the frame component 20. Once the partition panel 12 is inserted and the fabric 18 is mounted, the method further includes the step of moving the lockable element 42 about the integral hinge portion 44 to automatically and evenly tension the fabric 18 about the partition panel 12 in the cavity 26.

The invention has been described in an illustrative manner, and it is to be understood that the terminology that has been used is intended to be in the nature of words of description rather than of limitation. Obviously, many modifications and variations of the present invention are possible in light of the above teachings. Therefore, it is to be understood that within the scope of the appended claims, the invention may be practiced otherwise than as specifically described.

What is claimed is:

1. A frame component for automatically and evenly tensioning a fabric about first and second partition panels, said frame component comprising:
   a support element comprising;
      a first segment and a second segment extending transversely from said first segment to define a first cavity that is adapted to receive and support at least a portion of the first partition panel, and
      a third segment extending transversely from said second segment and a fourth segment extending transversely from said third segment to define a second cavity that is adapted to receive and support at least a portion of the second partition panel;
   a lockable element adapted to support at least a portion of the fabric, said lockable element extending from said support element and being moveable relative to said support element; and
   an integral hinge portion defined between said support element and said lockable element, said integral hinge portion enabling said movement of said lockable element relative to said support element such that the fabric supported on said lockable element is automatically and evenly tensioned about the first and second partition panels upon said movement of said lockable element.

2. A frame component as set forth in claim 1 further comprising a flexible backing strip spanning said support element and said lockable element to protect the fabric from said integral hinge portion as said lockable element moves to tension the fabric about the partition panel.

3. A frame component as set forth in claim 2 wherein said flexible backing strip is extruded onto said frame component to span said support element and said lockable element.

4. A frame component as set forth in claim 1 wherein said frame component is unitary.

5. A frame component as set forth in claim 1 wherein said lockable element comprises a flat segment to maximize a surface area of said lockable element that is available for suitably supporting the portion of the fabric.

6. A frame component as set forth in claim 1 further comprising an adhesive disposed on said lockable element wherein said adhesive is adapted to retain the portion of the fabric on said lockable element.

7. A frame component as set forth in claim 1 further comprising a plurality of fastening stems extending from said lockable element wherein said fastening stems are adapted to extend through the fabric to retain the portion of the fabric on said lockable element.

8. A frame component as set forth in claim 7 further comprising dome-shaped head portions disposed on said fastening stems wherein said dome-shaped head portions are adapted to extend through the fabric to retain the portion of the fabric on said lockable element.

9. A frame component as set forth in claim 1 further comprising an engagement lip extending integrally from said support element and away from said lockable element, said engagement lip engaging said lockable element upon said movement to retain said lockable element in a tensioned configuration such that the fabric is permanently tensioned about the partition panel.

10. A frame component as set forth in claim 9 further comprising a first locking mechanism disposed on said engagement lip, said first locking mechanism engaging said lockable element upon said movement of said lockable element.

11. A frame component as set forth in claim 10 further comprising a second locking mechanism projecting from said lockable element for engaging said first locking mechanism of said support element upon said movement of said lockable element.

12. A frame component as set forth in claim 11 wherein said first locking mechanism is extruded onto said engagement lip of said support element, and said second locking mechanism is extruded onto said lockable element.

13. A frame component for automatically and evenly tensioning a fabric about a partition panel, said frame component comprising:
   a support element adapted to support at least a portion of the partition panel;
   a lockable element adapted to support at least a portion of the fabric, said lockable element extending from said support element and being moveable relative to said support element;
   an integral hinge portion defined between said support element and said lockable element, said integral hinge portion enabling said movement of said lockable element relative to said support element such that the fabric supported on said lockable element is automatically and evenly tensioned about the partition panel upon said movement of said lockable element; and
   a flexible backing strip spanning said support element and said lockable element to protect the fabric from said integral hinge portion as said lockable element moves to tension the fabric about the partition panel.

14. A frame component as set forth in claim 13 wherein said flexible backing strip is extruded onto said frame component to span said support element and said lockable element.

15. A frame component as set forth in claim 13 wherein said frame component is unitary.

16. A frame component as set forth in claim 13 wherein said lockable element comprises a flat segment to maximize a surface area of said lockable element that is available for suitably supporting the portion of the fabric.

17. A frame component as set forth in claim 13 further comprising an adhesive disposed on said lockable element wherein said adhesive is adapted to retain the portion of the fabric on said lockable element.

18. A frame component as set forth in claim 13 further comprising a plurality of fastening stems extending from said lockable element wherein said fastening stems are adapted to extend through the fabric to retain the portion of the fabric on said lockable element.

19. A frame component as set forth in claim 18 further comprising dome-shaped head portions disposed on said fastening stems wherein said dome-shaped head portions are adapted to extend through the fabric to retain the portion of the fabric on said lockable element.

20. A frame component as set forth in claim 13 further comprising an engagement lip extending integrally from said support element and away from said lockable element, said engagement lip engaging said lockable element upon said movement to retain said lockable element in a tensioned configuration such that the fabric is permanently tensioned about the partition panel.

21. A frame component as set forth in claim 20 further comprising a first locking mechanism disposed on said engagement lip, said first locking mechanism engaging said lockable element upon said movement of said lockable element.

22. A frame component as set forth in claim 21 further comprising a second locking mechanism projecting from said lockable element for engaging said first locking mechanism of said support element upon said movement of said lockable element.

23. A frame component as set forth in claim 22 wherein said first locking mechanism is extruded onto said engagement lip of said support element, and said second locking mechanism is extruded onto said lockable element.

24. A frame component for automatically and evenly tensioning a fabric about a partition panel, said frame component comprising:
 a support element defining at least one cavity adapted to receive and support at least a portion of the partition panel;
 a lockable element adapted to support at least a portion of the fabric, said lockable element extending from said support element and being moveable relative to said support element;
 an integral hinge portion defined between said support element and said lockable element, said integral hinge portion enabling said movement of said lockable element relative to said support element such that the fabric supported on said lockable element is automatically and evenly tensioned about the partition panel upon said movement of said lockable element; and
 a flexible backing strip spanning said support element and said lockable element to protect the fabric from said integral hinge portion as said lockable element moves to tension the fabric about the partition panel.

25. A frame component as set forth in claim 24 wherein said at least one cavity defined by said support element is further defined as a first cavity adapted to receive and support a first partition panel, and a second cavity adapted to receive and support a second partition panel.

26. A frame component as set forth in claim 25 wherein said support element comprises a first segment and a second segment extending transversely from said first segment to define said first cavity that is adapted to receive and support the first partition panel.

27. A frame component as set forth in claim 26 wherein said support element further comprises a third segment extending transversely from said second segment, and a fourth segment extending transversely from said third segment to define said second cavity that is adapted to receive and support the second partition panel.

28. A frame component as set forth in claim 24 wherein said flexible backing strip is extruded onto said frame component to span said support element and said lockable element.

29. A frame component as set forth in claim 24 wherein said frame component is unitary.

30. A frame component as set forth in claim 24 wherein said lockable element comprises a flat segment to maximize a surface area of said lockable element that is available for suitably supporting the portion of the fabric.

31. A frame component as set forth in claim 24 further comprising an adhesive disposed on said lockable element wherein said adhesive is adapted to retain the portion of the fabric on said lockable element.

32. A frame component as set forth in claim 24 further comprising a plurality of fastening stems extending from said lockable element wherein said fastening stems are adapted to extend through the fabric to retain the portion of the fabric on said lockable element.

33. A frame component as set forth in claim 32 further comprising dome-shaped head portions disposed on said fastening stems wherein said dome-shaped head portions are adapted to extend through the fabric to retain the portion of the fabric on said lockable element.

34. A frame component as set forth in claim 24 further comprising an engagement lip extending integrally from said support element and away from said lockable element, said engagement lip engaging said lockable element upon said movement to retain said lockable element in a tensioned configuration such that the fabric is permanently tensioned about the partition panel.

35. A frame component as set forth in claim 34 further comprising a first locking mechanism disposed on said engagement lip, said first locking mechanism engaging said lockable element upon said movement of said lockable element.

36. A frame component as set forth in claim 35 further comprising a second locking mechanism projecting from said lockable element for engaging said first locking mechanism of said support element upon said movement of said lockable element.

37. A frame component as set forth in claim 36 wherein said first locking mechanism is extruded onto said engagement lip of said support element, and said second locking mechanism is extruded onto said lockable element.

38. A frame component for automatically and evenly tensioning a fabric about a partition panel, said frame component comprising:
 a support element defining at least one cavity adapted to receive and support at least a portion of the partition panel;
 a lockable element adapted to support at least a portion of the fabric, said lockable element extending from said support element and being moveable relative to said support element;
 an adhesive disposed on said lockable element wherein said adhesive is adapted to retain the portion of the fabric on said lockable element; and
 an integral hinge portion defined between said support element and said lockable element, said integral hinge portion enabling said movement of said lockable element relative to said support element such that the fabric supported on said lockable element is automatically and evenly tensioned about the partition panel upon said movement of said lockable element.

39. A frame component as set forth in claim 38 wherein said adhesive comprises a polyurethane resin.

40. A frame component as set forth in claim 38 wherein said lockable element comprises a flat segment to maximize a surface area of said lockable element that is available for suitably supporting the portion of the fabric.

41. A frame component as set forth in claim 40 wherein said adhesive is disposed on said flat segment.

42. A frame component as set forth in claim 38 wherein said frame component is unitary.

43. A frame component as set forth in claim 38 further comprising a flexible backing strip spanning said support element and said lockable element to protect the fabric from said integral hinge portion as said lockable element moves to tension the fabric about the partition panel.

44. A frame component as set forth in claim 35 further comprising a plurality of fastening stems extending from said lockable element wherein said fastening stems are adapted to extend through the fabric to retain the portion of the fabric on said lockable element.

45. A frame component for automatically and evenly tensioning a fabric about a partition panel, said frame component comprising:

a support element defining at least one cavity adapted to receive and support at least a portion of the partition panel;

a lockable element adapted to support at least a portion of the fabric, said lockable element extending from said support element and being moveable relative to said support element;

a plurality of fastening stems extending from said lockable element wherein said fastening stems are adapted to extend through the fabric to retain the portion of the fabric on said lockable element; and an integral hinge portion defined between said support element and said lockable element, said integral hinge portion enabling said movement of said lockable element relative to said support element such that the fabric supported on said lockable element is automatically and evenly tensioned about the partition panel upon said movement of said lockable element.

46. A frame component as set forth in claim 45 further comprising dome-shaped head portions disposed on said fastening stems wherein said dome-shaped head portions are adapted to extend through the fabric to retain the portion of the fabric on said lockable element.

47. A frame component as set forth in claim 46 wherein one dome-shaped head portion is disposed on each of said fastening stems.

48. A frame component as set forth in claim 45 wherein said lockable element comprises a flat segment to maximize a surface area of said lockable element that is available for suitably supporting the portion of the fabric.

49. A frame component as set forth in claim 48 wherein said lockable element further comprising a fastener support strip adjacent said flat segment for supporting said fastening stems.

50. A frame component as set forth in claim 49 wherein said fastener support strip and said fastening stems are snap-fit onto said frame component.

51. A frame component as set forth in claim 49 wherein said fastener support strip and said fastening stems are extruded onto said frame component.

52. A frame component as set forth in claim 45 further comprising an adhesive disposed on said lockable element wherein said adhesive is adapted to retain the portion oft fabric on said lockable element.

53. A frame component as set forth in claim 45 further comprising a flexible backing strip spanning said support element and said lockable element to protect the fabric from said integral hinge portion as said lockable element moves to tension the fabric about the partition panel.

* * * * *